Jan. 22, 1952     L. C. McCARTY, JR., ET AL     2,583,184
CONTROLLER FOR MONOGRAM SIGNS

Filed Aug. 19, 1948     6 Sheets—Sheet 1

Inventors
LEWIS C. MC CARTY, JR.
HAROLD G. FELIO

By George H. Mitchell
Attorney

Jan. 22, 1952  L. C. McCARTY, JR., ET AL  2,583,184
CONTROLLER FOR MONOGRAM SIGNS
Filed Aug. 19, 1948  6 Sheets-Sheet 3

Inventors
LEWIS C. MC CARTY, JR.
HAROLD G. FELIO
By George H. Mitchell
Attorney

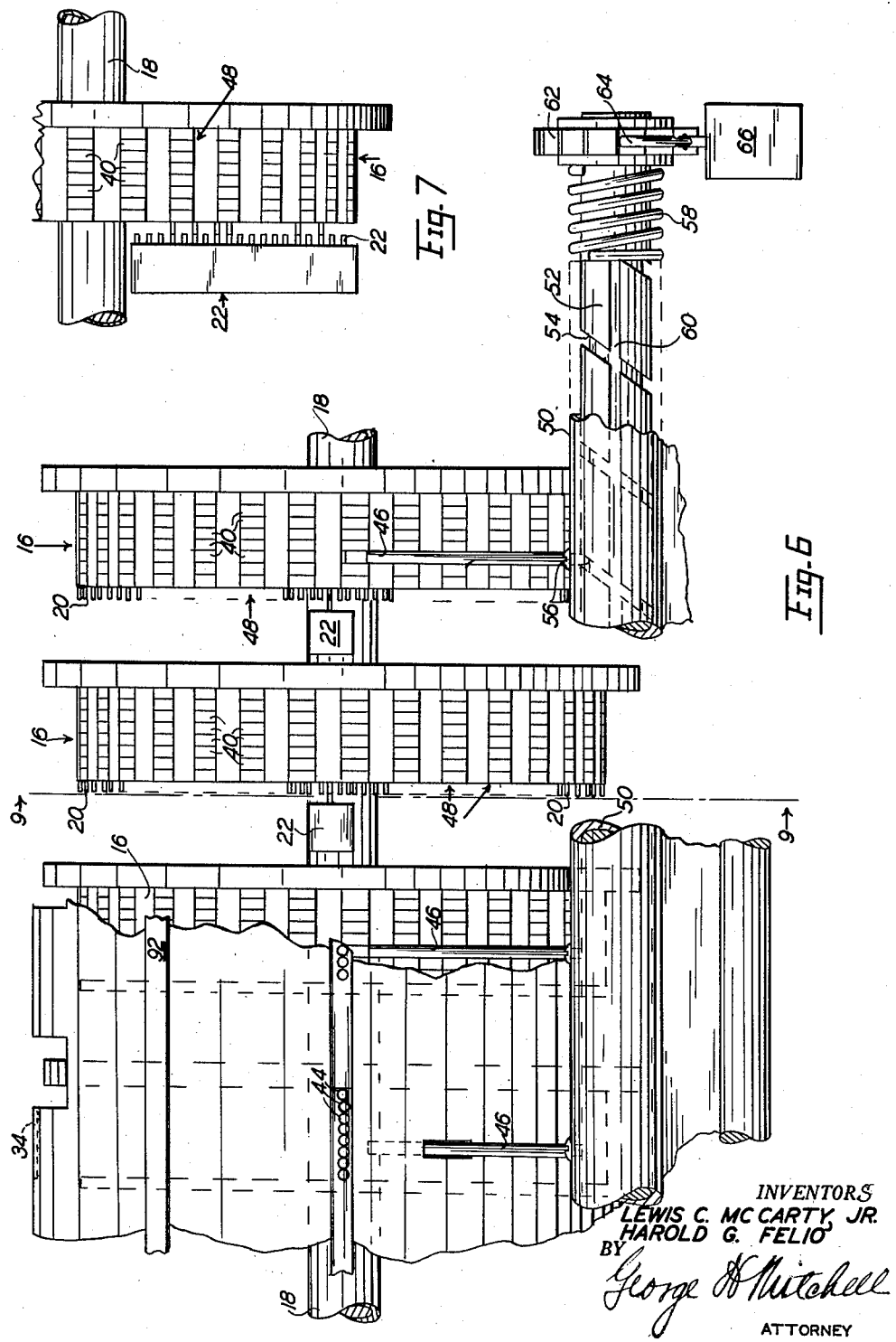

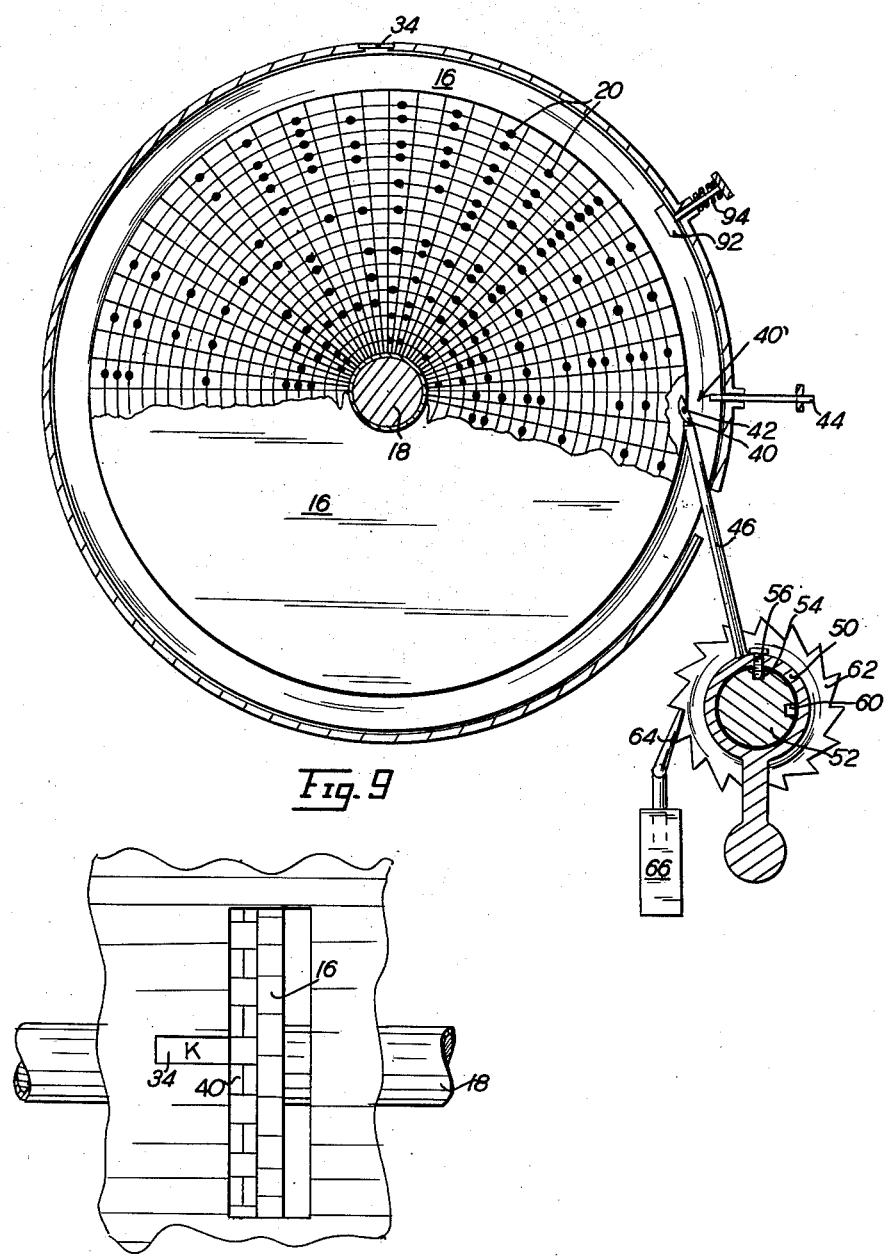

Patented Jan. 22, 1952

2,583,184

UNITED STATES PATENT OFFICE 2,583,184

CONTROLLER FOR MONOGRAM SIGNS

Lewis C. McCarty, Jr., and Harold G. Felio, New York, N. Y., assignors to The Marine Aircraft Corporation, New York, N. Y., a corporation of New York Application August 19, 1948, Serial No. 45,056

7 Claims. (Cl. 177—348)

This invention is a controller for electric signs, particularly monogram signs made up of luminous tubes. By monogram signs is meant a sign composed of an assembly of gas filled tubes, commonly called "neon" tubes, which tubes can be selectively lighted in various combinations to form letters, numerals and similar symbols.

The electric sign of the present invention consists of any desired number of monogram letters, conveniently 10, 15 or 20. These monogram letters may be mounted in various places, such for example, as on the underside of the wings of an airplane, on a building, on a signboard, on the side of a railway car, as desired. The signs would be simultaneously lighted to show a word or phrase, a baseball score, etc. These letters would remain lighted as long as desired, and then by manual or automatic means, another group of letters would be lighted.

Any of the monogram letters can be lighted to show any letter of the alphabet, or any numeral, by selective energization, in proper combinations of the gas tubes.

More specifically, each monogram letter is controlled by a control wheel, settable for each letter of the alphabet and for the usual numerals. Each control wheel has a group of actuating pins on one side or face thereof, each group of pins being differently positioned from the pins in any other group. For example, with 26 letters and 9 numerals and a hyphen, there would be 36 different groups of actuating pins on each control wheel.

Positioned adjacent the desired groups of actuating pins is a bank of switches, preferably of the type known as micro-switches, adapted to be selectively contacted by and closed by a particular group of actuating pins; the actuating pins, as mentioned above, have been carefully set in individual groups, in particular positions, so as to contact the proper switches of the bank of switches to light the proper tubes in the monogram sign assembly to form the letter or numeral corresponding to the selected group of actuating pins.

The several tube sections or tube units making up the monogram sign are connected in series; associated with each section or tube unit is a relay, connected to short circuit and render inoperative that particular tube. The shortening relay for each tube is controlled by a micro-switch; therefore, the pins on the control wheel, for a particular letter, are set to actuate all the relays for the tubes that are not used for forming that letter, leaving in circuit the tubes that are used for forming that letter. When the several control wheels are set for a group of letters, a master switch or relay lights all the letters simultaneously.

In order to change the entire sign from one group of letters to another group, each control wheel is provided with a group of settable stops, say about 10 or 12. If the control wheel controls, say, a total of 35 characters, it would have 35 settable stops. After the stops are set, the wheels are turned until stopped by the first settable stop engaging its stop arm, whereby the pins on that wheel operate the necessary switches for the shorting relays to form or light the letter corresponding to that stop.

In order to show a sequence of 10 or 12 words, for example, the stop arms for all the control wheels engage the first series of stops; then the several stop arms, say a half minute or minute later, are simultaneously moved to the next position and serve to engage the second set of stops, thereby positioning the switch actuating pins for operating the switches for the second group of letters or symbols; and so on until the whole series of letters is lighted.

After the series has been completed, the stop arm is automatically returned to its starting position, thereby completing the cycle.

The particular arrangement of luminous gas tubes making up the monogram letter constitutes an important feature of the invention, which arrangement will be described in more detail below.

Further advantages and details of the invention will be described in connection with the accompanying drawings, in which:

Fig. 6 is a diagrammatic side view, partially broken away, showing the controller of the present invention.

Fig. 7 is a view of a detail of Fig. 6.

Fig. 8 is a top view of another detail of Fig. 6.

Fig. 9 is a cross-section taken on line 9—9 of Fig. 6.

Figure 1:
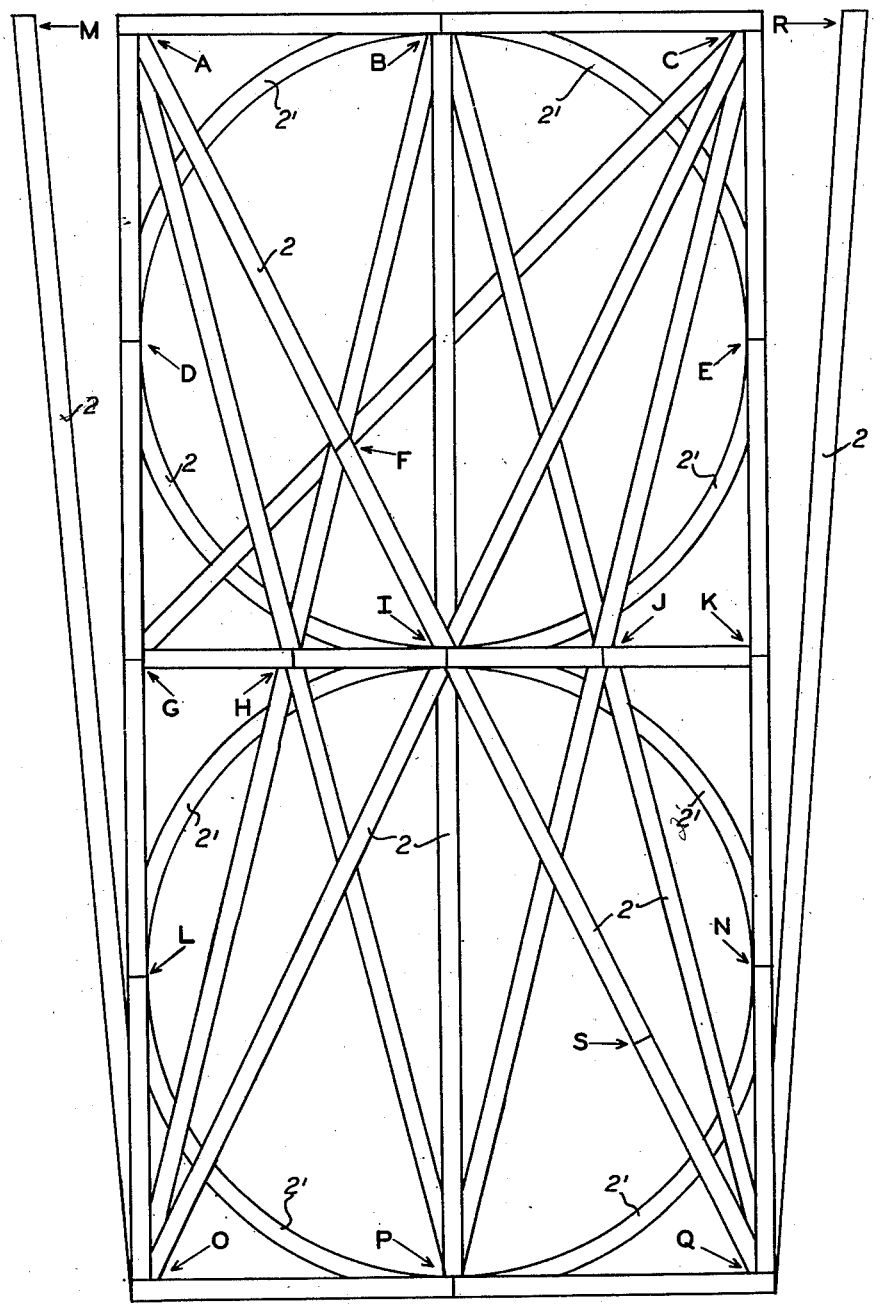
Fig. 1 is a plan view of the monogram sign of the present invention.

The controller of the present invention is particularly for use in selectively lighting gas-filled tubes in a composite monogram sign of the type shown diagrammatically in Fig. 1. In Fig. 1, the various tubes making up the sign are indicated generally by the numeral 2. The tubes cross each other at various angles and are of various lengths and shapes, as clearly shown in Fig. 1. Certain tubes have common electrical junction points with other tubes and such junction points are indicated by the capital letters A to S inclusive. Most of the tubes are straight but in the upper half of the letter, four of the tubes, as shown at 2', are made approximately in the shape of a quadrant of a circle. A similar group of four tubes 2' is shown in the lower half of the monogram letter.

Figure 2:
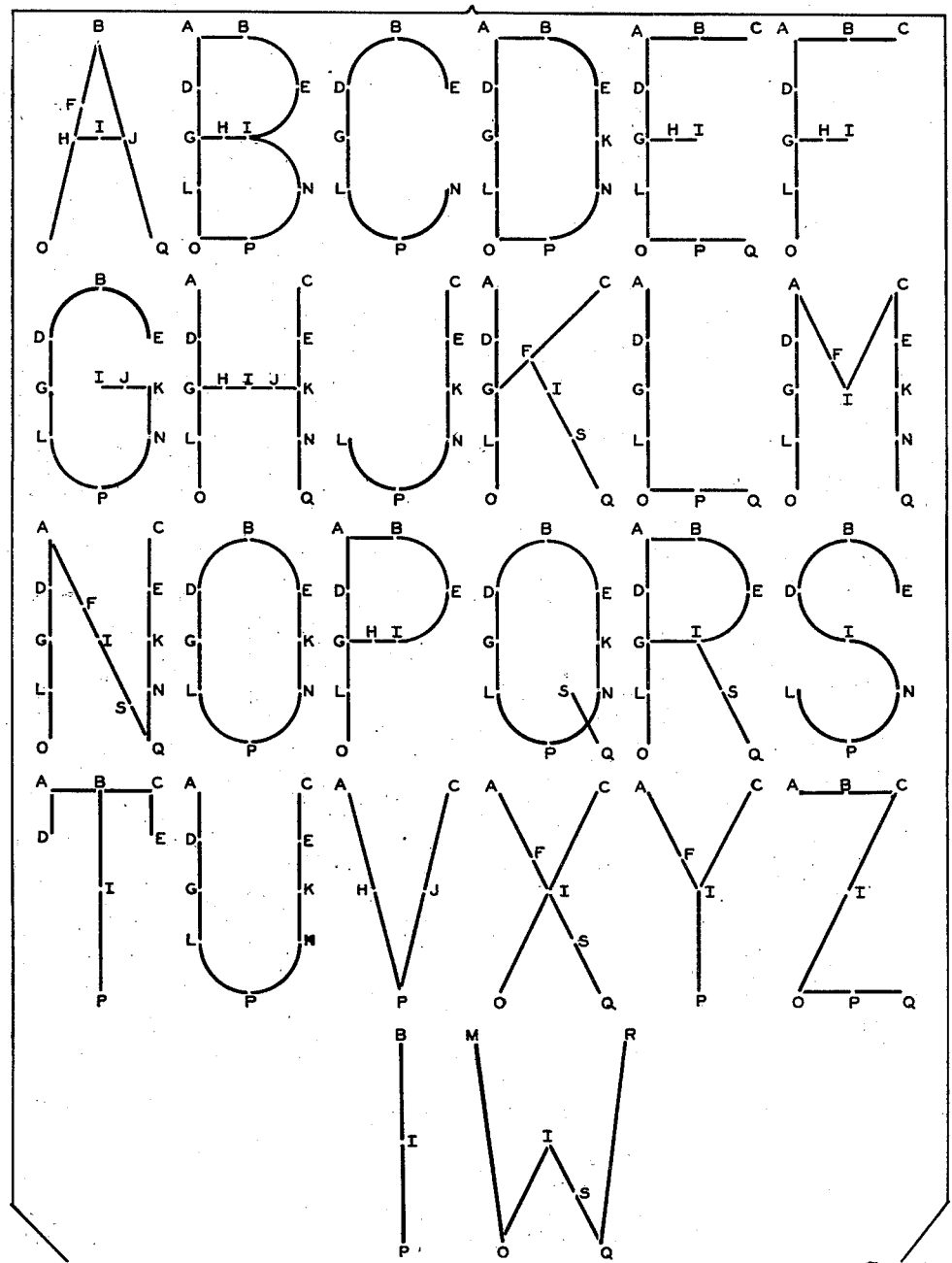
Fig. 2 is a view showing the formation of the alphabet with the monogram sign.

An important feature of the sign is the outer pair of tubes, OM at the left and QR at the right. These outer tubes are particularly for forming the letter W, in cooperation, of course, with tubes OH, HB, BJ and JQ. Other letters of the alphabet are formed by lighting selected tubes, as shown in Fig. 2, the small capital letters of Fig. 2 indicating the same tube terminals as shown in Fig. 1.

Figure 3:
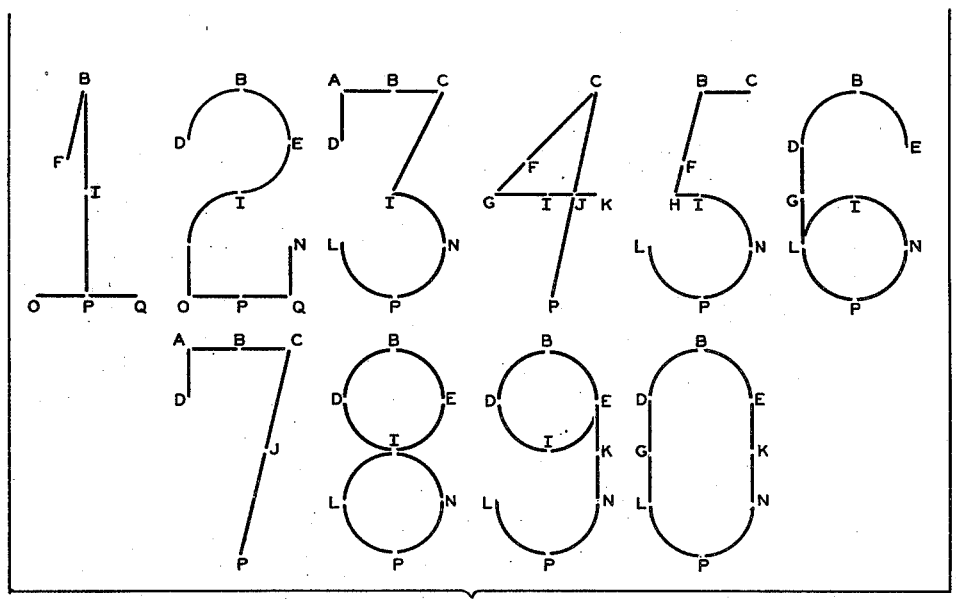
Fig. 3 is a view showing the formation of a set of numerals with the monogram sign.

Numerals are formed as shown in Fig. 3 while a hyphen would be formed by the tubes GI and IK.

All of the tubes composing the monogram letter are connected in series. However, each tube may be short-circuited by a shunt circuit shown at 4 in Fig. 4, and these shunt circuits may be closed as required by the armatures 6 operated by relays, as will be described. In order to form a particular letter, the tubes not to be used in forming the letter are short circuited by their respective armatures 6, and so are out of operation so that the tubes will not be lighted, thus leaving in circuit the tubes that are to be lighted to form the sign.

Figure 4:
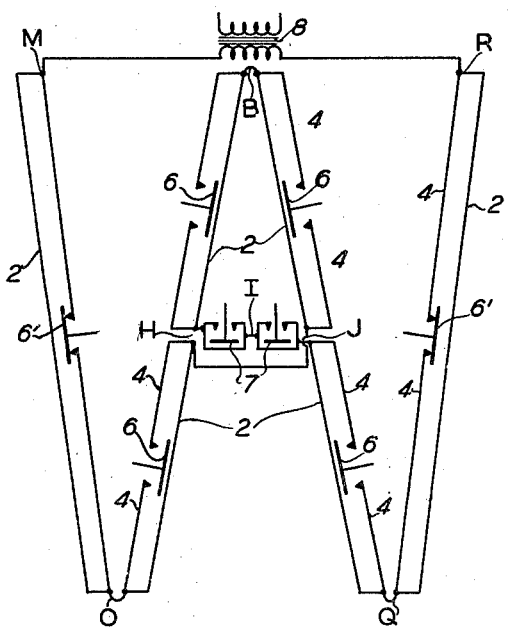
Fig. 4 is a wiring diagram, showing the formation of the letter "W."
Figure 5:
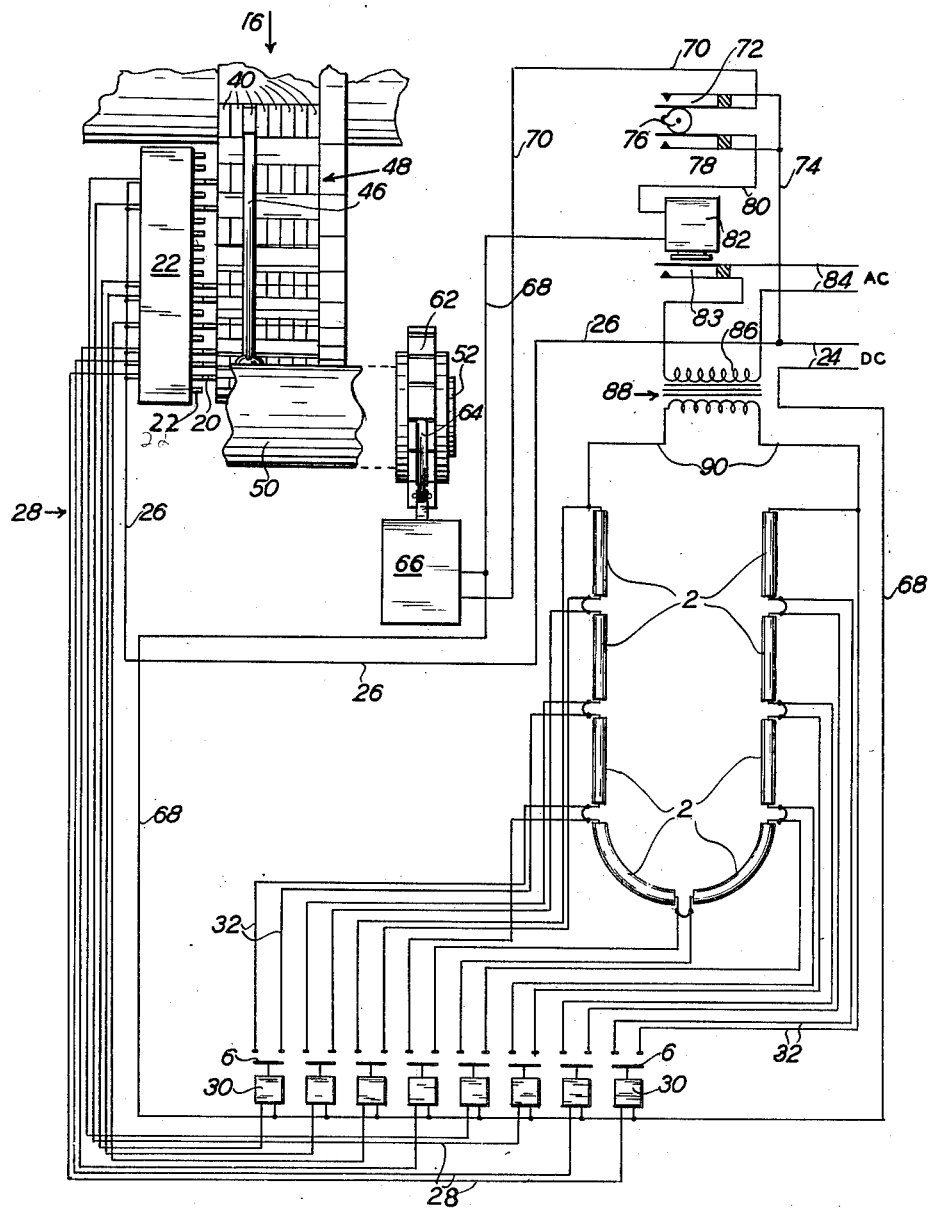
Fig. 5 is a wiring diagram of the controller.

Referring to the diagrammatic view of Fig. 4, the formation of the letter A is there shown. All of the tubes in the sign, except the six used for the letter, are short-circuited by their respective relays, as indicated by the positions of the armatures 6' of the relays. For convenience of illustration, the only armatures 6' shown in the closed position are those for short-circuiting the outer inclined pair of tubes OM and QR. High tension current from the transformer 8 reaches R, is short-circuited by wires 4 around tube 2, then reaches Q, passes through tubes QJ, JB, BH and HO, to form the legs of the letter A. The cross bar of the letter A is formed by tubes HI and IJ, their short-circuiting armatures 7 being in the open position, thereby causing the lighting of the tubes.

The principle, as described above in connection with the letter A, is used for forming other letters, symbols and numerals, as detailed in Figs. 2 and 3.

The entire sign of the present invention includes any desired number of monogram signs like the monogram of Fig. 1, say about 10 to 20 of such monograms. With the control apparatus about to be described, the entire bank of letters is lighted to show a word or phrase for a certain length of time and then the control apparatus re-lights the entire bank with a new word or words, and so on through successive words, as falling within the capacity of the control apparatus.

The control apparatus comprises a series of control wheels or drums shown at 16, one control wheel being provided for each monogram letter. These control wheels are mounted on a shaft 18 driven frictionally by such shaft, the shaft being driven at low speed by a motor. One face of each control wheel 16 is provided with individual groups of actuating pins 20 arranged in radially extending zones, Fig. 9. If the wheel is intended to have a capacity of lighting any one of 36 symbols, it would have 36 different groups of pins 20 and the pins in each group would be differently arranged from the pins in the other groups so that an operative group of pins would short-circuit the tubes not needed for the letter controlled by that group, allowing the tubes needed for the letter controlled by that group to be lighted, as described in connection with Fig. 4.

The actuating pins 20 are adapted to contact with a radially extending bank of precision switches 22. The switches 22 are in circuit with a direct current line 24 through the wire 26. The return wires 28 from the various switches lead to individual short circuiting relays 30 which serve to operate the short-circuiting armatures 6 already described. Each armature 6 is connected by wires 32 like the wires 4 of Fig. 4, to opposite terminals of the several tubes 2, as already described, for short-circuiting them.

The control wheel 16 is marked on its periphery with the various letters, symbols and numerals that are controlled by the wheel. When the wheel is turned so that the letter K, for example, shows up through the window 34, a group of pins 20 on the wheel engage a particular group of precision switches 22 to short-circuit the tubes not needed, so that the necessary tubes for forming the letter K will be lighted.

Each control wheel 16 is provided with a series of settable stops 40, these stops being pivoted on pivots 42 so that when one end of a stop is pushed in by a set-up key 44, the stop will be pivoted outwardly to stopping position, as shown at 40', so that when a particular stop 40 engages stop arm 46, the wheel will be stopped and set at that point. There is a stop arm 46 for each control wheel 16. In this stopping position, if the letter K, for example, appears through window 34, the wheel 16 will be stopped at a point so that the proper group of pins 20 will actuate a selected group of switches 22 for causing the lighting of appropriate tubes 2 for forming the letter K.

If the wheel is designed to control the formation of any one of 36 symbols, it would be provided with 36 of these stops.

Moreover, these stops are arranged in any desired number of banks, eight, for example, indicated generally at 48. This means that the wheel has a capacity of forming eight letters or symbols in succession, depending upon the setting of one stop in each of the eight banks of stops.

In order that a series of letters may be lighted automatically in a timed sequence, each stop arm 46 is caused to travel in a direction parallel to the axis of the wheel 16, beginning preferably in the first zone of the several banks 48. Each stop arm 46 engages the first stop in the first bank, holding the wheel 16 at that point for the desired period, and then it is moved on at successive intervals of, say, a minute or two, to the next set of stops, holding the corresponding wheel 16 there to show the second letter, and so on, through the whole series of eight letters set up in the eight banks 48.

In order to effect movement of the stop arm 46, each such arm is provided with a sleeve 50 through which passes the threaded shaft 52 provided with threads 54 engaged by a pin 56 in the sleeve 50, so that when each shaft 52 is slowly rotated, the arm 46 is progressed from one stop 40 to the next in succession to show the eight letters controlled by this particular wheel, as described above. The thread 54 has a high pitch, so that one revolution of the shaft 52 will move stop arm 46 into successive engagement with the eight stops of bank 48.

When the stop arm 46 reaches the end of its travel, it is released by the shaft 52 and a retracting spring 58 retracts it to its original position, the shaft 52 being provided with a longitudinal slot 60 to permit this return stroke of arm 46.

Shaft 52 is slowly and intermittently moved by a ratchet wheel 62 fixed on one end, which ratchet wheel is actuated by a pawl 64 controlled by solenoid 66. Each actuation of ratchet wheel 62 moves stop arm 46 from one position to the next, preparatory to lighting another letter. The solenoid 66 is connected by wire 68 with one side of the D. C. line 24 and by wire 70 to relay 72, the other side of the relay being connected by wire 74 to the other side of the D. C. line.

A master timer 76, consisting essentially of a slowly rotating cam member, closes relay 72 at intervals and also is arranged to close at periodic intervals a second relay 78 which is connected by a wire 80 to a master relay 82, master relay 82 being also connected to wire 68. When master relay 82 is energized, it closes a circuit through relay 83 from the A. C. line 84 which is connected in the primary 86 of a high tension transformer 88, the secondary of which is connected by wires 90 for lighting the appropriate tubes 2 in the monogram sign.

To summarize the operation: The 8 settable stops 40 on each wheel are positioned by the set-up keys 44, these stops being selected according to the 8 letters that are to be successively lighted by the wheel. The wheels 16 are moved by shaft 18 until the stop in the first zone or section of bank 48 of each wheel engages the stop arm 46, thereby setting the wheels for the first letter. The master timer 76 now closes the circuit through relay 78, which closes relay 83 for lighting the first series of letters.

Master timer 76 continues to rotate, holding relay 78 closed and the letters lighted as long as desired. It then moves away from 78, thereby extinguishing the first set of letters. It then moves, preferably at an accelerated rate, to close relay 72, which completes the circuit through solenoid 66 and wire 74, thereby operating the ratchet wheel 62 and shaft 52 to move stop arm 46 to the next zone or bank; the wheels 16 are now advanced by shaft 18 until the several stop arms 46 for each wheel engage respective stops 40 in the second zone, stopping the wheel, thereby positioning the wheel for the second letter. Master timer 76 then continues around and operates relay 78, which closes the relay 83 to light the second series of letters. The timer then closes relay 72 again, to repeat the cycle.

After arm 46 has reached its position at the extreme right, shaft 52 has made one revolution, and the spring returns sleeve 50 and arm 46 to the starting position. The apparatus will then start over again, and show the same set of words over again, if desired.

If it is desired to clear the wheels and to set up a new series of words, shaft 18 is driven in the reverse direction for one full revolution, so that the several stops 40 are pushed back to their original positions by engaging against a clearance bar 92, which conveniently may be resiliently pressed outwardly by springs 94 to be clear of stops 40 and pressed inwardly manually to engage the stops 40 when the wheels are reversed, as described.

While the preferred construction of the apparatus has been described in some detail, it should be understood that the invention is not to be limited to the precise details illustrated, but may be carried out in other ways.

We claim as our invention:

1. A controller for electric signs, comprising in combination a plurality of control wheels frictionally mounted on a common operating shaft, means for rotating said shaft continuously in one direction, switch actuating pins arranged in zones in different combinations on one face of each wheel, a bank of switches, operatively connected to control the lights of the sign, fixed alongside each control wheel for operative engagement with the switch actuating pins of a particular zone, dependent upon the angular setting of the control wheel on said shaft, a plurality of circumferentially extending rows of settable stops carried by each control wheel, said stops being arranged in a plurality of groups positioned side by side; a stop arm for each control wheel, cooperating with the stops thereon; and means for periodically moving all of said stop arms laterally from one group of stops to the next adjacent group; whereby the control wheels are moved by said shaft to new angular positions on said shaft, as determined by the positioning of the settable stops in said next adjacent group.

2. The combination as called for in claim 1, additionally including means, including a master timer, for periodically extinguishing one group of letters of the sign, then moving the control wheels to new angular positions on said shaft, and then lighting a new group of letters, as determined by the new angular positions of said control wheels.

3. In a controller for electric signs having a group of indicia, each of said indicia including circuits for actuating a plurality of visible characters, the combination including a rotatable control member for each of said indicia having a plurality of positions including actuating means for a circuit in each of said positions, drive means for urging rotation of said control members, a plurality of banks of settable stop means disposed in parallel planes of rotation of said control members, catch means for each of said control members shiftable to successive locations in a direction normal to said planes to coact with a settable stop means of each of said banks to position each of said control members independently in each of said locations, transverse drive means for shifting said catch means simultaneously successively from one of said locations to the last of said locations step-by-step in one direction and from said last location to said one location in one step in the other direction, and timing means for alternately actuating said transverse drive means and said circuits for the visible characters.

4. In a controller for electric signs having a group of indicia, each of said indicia including circuits for actuating a plurality of visible characters, the combination including a rotatable control member for each of said indicia having a plurality of positions including actuating means for a circuit in each of said positions, drive means for urging rotation of said control members, a plurality of banks of settable stop means disposed in parallel planes of rotation on said control members, catch means for each of said control members shiftable to successive locations in a direction to coact with successive banks of said settable stops to position each of said control members independently in each of said locations, intermittent advancing drive means for simultaneous shifting of said catch means to said successive locations, and timing means for alternately actuating said advancing drive means and said circuits for the visible characters.

5. In a controller for electric signs having a group of indicia, each of said indicia including circuits for actuating a plurality of visible characters, the combination including a rotatable control member for each of said indicia having a plurality of positions including actuating means for a circuit in each of said positions, drive means for urging rotation of said control members, a plurality of settable stop means for each of said control members, shiftable catch means for coaction with the settable stop means having a plurality of locations for simultaneously independently positioning each of said control members in each of said locations, and synchronizing means for sequentially locating said catch means in successive locations and actuating said circuits for the visible characters.

6. In a controller for electric signs having a group of separate indicia, each of said indicia including circuits for actuating a plurality of stationary visible characters, the combination including a resistably rotatable switching means for each of said indicia having a plurality of positions including actuating means for a circuit in each of said positions, shiftable holding means having a plurality of locations for positioning said switching means including adjustable stop means for simultaneously independently positioning said switching means in each of said locations, and synchronizing means for sequentially shifting said holding means and actuating said circuits for the visible characters.

7. In a controller for electric signs having a group of separate indicia, each of said indicia including circuits for actuating a plurality of stationary visible characters, the combination including a resistably rotatable switching means for each of said indicia having a plurality of positions including actuating means for a circuit in each of said positions, shiftable means having a plurality of locations for resisting rotation of said switching means including adjustable stop means for simultaneously independently positioning said switching means in each of said locations, transverse drive means for moving said shiftable means successively from one of said locations to the last of said locations step-by-step in one direction and from said last location to said one location in one step in the other direction, and energizing means for actuating said transverse drive means and said circuits for the visible characters.

LEWIS C. McCARTY, Jr.
HAROLD G. FELIO.

REFERENCES CITED

The following references are of record in the file of this patent:

UNITED STATES PATENTS

| Number | Name | Date |
| --- | --- | --- |
| 1,504,112 | Faulkner | Aug. 5, 1924 |
| 1,701,204 | Glatzner | Feb. 5, 1929 |
| 2,001,124 | Cooke | May 14, 1935 |
| 2,114,678 | Funk | Apr. 19, 1938 |
| 2,337,988 | Chiggini | Dec. 28, 1943 |
| 2,343,594 | Unkles et al. | June 10, 1947 |
| 2,422,149 | Unkles et al. | June 10, 1947 |